April 20, 1954   O. BOLTON   2,675,579
SAUSAGE CASING PERFORATOR
Filed Nov. 24, 1952
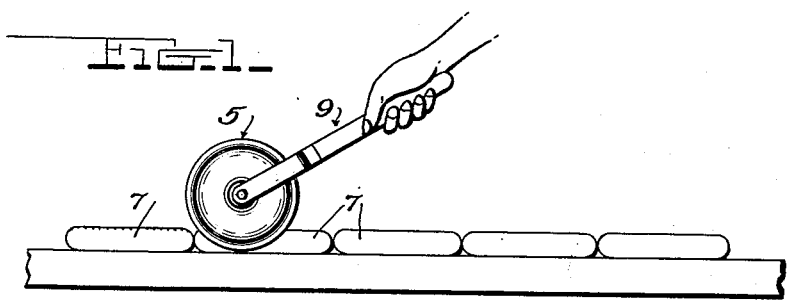
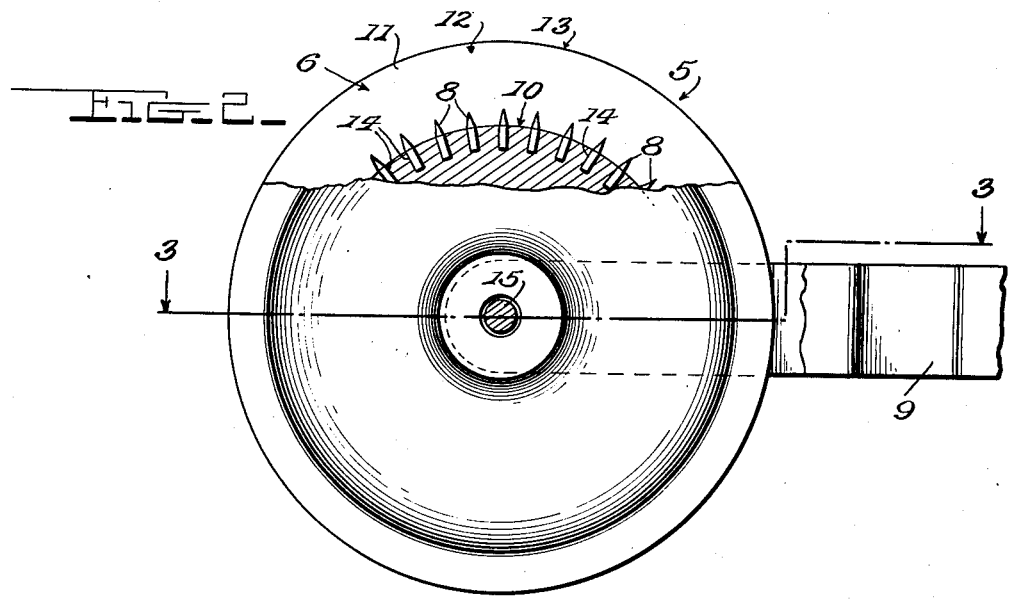
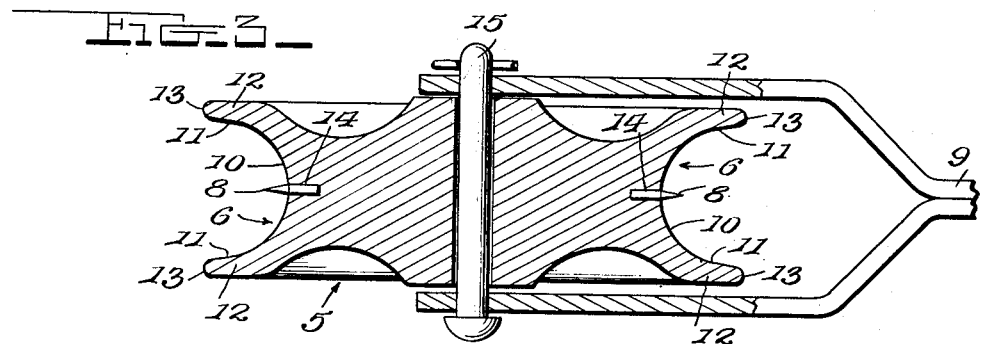
INVENTOR
*Otto Bolton*
BY *Bryant & Lowry*
ATTORNEYS Patented Apr. 20, 1954

2,675,579

UNITED STATES PATENT OFFICE 2,675,579

SAUSAGE CASING PERFORATOR

Otto Bolton, Denver, Colo.

Application November 24, 1952, Serial No. 322,324

2 Claims. (Cl. 17—1)

In the meat packing industry, the so-called skinless wieners, frankfurters, etc. are initially formed by stuffing the raw meat into synthetic casings of cellophane or the like. Then, the meat smoking and pre-cooking steps are performed while the meat is within the casings, and before packaging for the market, said casings are removed. Thus, when such skinless sausages are being finally prepared for serving, usually by immersion in boiling water, they lack the protection of the casings and the natural flavors and juices escape into the water. Consequently the skinless sausages have less flavor than those cooked in casings. For this reason, it is highly desirable to provide frankfurters and the like to be cooked in their casings and to be converted to skinless form by removal of the casings immediately before serving or eating. The synthetic casings, however, are tough and hard to remove. Moreover, during removal a great deal of the meat sticks to the casings and is usually wasted.

It has been found that if the synthetic casings of such products are linearly perforated before final cooking for serving, the casings will break along the lines of perforations at about the time the cooking period should be terminated and that said casings will then fall away from the cooked meat. Thus, the product retains its flavor and juices and is self-converting to skinless form for serving.

It is the object of the present invention to provide a simple, inexpensive and easily operable device whereby the synthetic casings may be quickly and easily perforated in the kitchen before cooking, thus making it practicable to market the product with the meat fully protected by the casings and also making it practicable to cook the product in said casings without the disadvantages above set forth.

With the above and other objects in view that will become apparent as the nature of the invention is better understood, the same consists in the novel form, combination and arrangement of parts hereinafter more fully described, shown in the accompanying drawing, and particularly claimed.

In the drawing:

Fig. 1 is a side elevation showing the manner of using the invention to successively perforate the casings of the various links of a chain of frankfurters or the like;

Fig. 2 is an enlarged fragmentary elevation, partly broken away and in section, showing the perforating wheel and a portion of its operating handle; and Fig. 3 is a sectional view, partly in elevation, on line 3—3 of Fig. 2.

A wheel 5 is provided having a peripheral channel 6 to receive the frankfurters or the like 7, and in the bottom of said channel perforating spurs 8 are provided. Thus, by laying the frankfurters or the like upon a table and simply rolling the wheel 5 lengthwise of them, the skins or casings will be perforated as desired, whether said frankfurters or the like be separate or connected in chain form. An operating handle 9 carries the wheel 5 and may be readily gripped in one hand as seen in Fig. 1.

The wheel 5 is preferably formed from stainless steel or aluminum and while this wheel is shown in the form of a rather massive body, it could well be of hollow form and constructed from properly stamped sheet metal sections tightly secured together.

The channel 6 preferably has a transversely curved bottom 10 merging into the smooth inner sides 11 of the channel side walls or flanges 12, said sides being substantially parallel and adapted for confining and centering a sausage in said channel whereby the perforating spurs act on the sausage at the longitudinal center line thereof, and the peripheral edges 13 of said side walls or flanges are rounded to prevent them from cutting the casings of the frankfurters or the like if the wheel should deviate from its proper line of travel during operation. This construction will also guide the various links of a chain of the "franks" or other sausages into the channel 6 even if said chain be not laid in a straight line on the table. Moreover, the rounded edges 13 prevent the wheel from cutting or marring the table.

The perforating spurs 8 may either have conical points as shown, or chisel points and said spurs may be connected with the wheel 5 in any desired manner. As shown, they are tightly held in sockets 14 drilled or otherwise formed in the wheel 5. These spurs are suitably spaced apart circumferentially of the wheel. The spacing may be from ⅛" to ⅝".

The handle 9 is preferably formed from stainless steel or aluminum and the same is true of the axle pin 15 which connects the wheel 5 to said handle. In the present showing, the front end of this handle is bifurcated and its furcations straddle the wheel.

While the axle pin 15 is preferably employed for simplicity, the wheel and handle could obviously be connected in any other suitable way.

From the foregoing, it will be seen that a simple, inexpensive and easily operable device has been provided for the intended purpose, and while preferences have been disclosed, it will be obvious that variations may be made within the scope of the invention as claimed. Moreover, it is to be understood that the invention is not restricted to an aluminum or stainless steel construction. In fact, a modern plastic could well be employed. The material used, however, should be such that it may be easily kept immaculately clean and sanitary as these are important considerations in any device used in the preparation of food.

I claim:

1. A sausage casing perforator comprising a handle to be gripped in one of the user's hands, and a wheel mounted on the front end of said handle, said wheel having a peripheral channel to receive the sausages as the wheel is rolled upon a table on which the sausages are laid, said wheel having perforating spurs at the bottom of said channel, spaced-apart circumferentially of the wheel, said channel having substantially parallel side flanges provided with smooth inner sides adapted for confining and centering a sausage in said channel whereby the perforating spurs act on the sausage at the longitudinal center line thereof, said side flanges having rounded peripheral edges and said channel also having a transversely curved smooth bottom merged into said smooth sides of said flanges.

2. A sausage casing perforator as set forth in claim 1, wherein said wheel has sockets in which said spurs are secured.

References Cited in the file of this patent

UNITED STATES PATENTS

| Number | Name | Date |
|---|---|---|
| 429,442 | Hamill | June 3, 1890 |
| 969,230 | Whitlock | Sept. 6, 1910 |
| 1,645,385 | Kaplan | Oct. 11, 1927 |
| 1,689,879 | Krout | Oct. 30, 1928 |
| 1,692,559 | Miller | Nov. 20, 1928 |
| 2,390,096 | Goepfert | Dec. 4, 1945 |
| 2,615,196 | Ohanian | Oct. 28, 1952 |